United States Patent [19]

Lynk, Jr. et al.

[11] 4,012,597
[45] Mar. 15, 1977

[54] TRANSMISSION TRUNK MULTICHANNEL DISPATCH SYSTEM WITH PRIORITY QUEUING

[75] Inventors: Charles Nelson Lynk, Jr., Arlington Heights; James Joseph Mikulski, Deerfield, both of Ill.

[73] Assignee: Motorola, Inc., Schaumburg, Ill.

[22] Filed: Nov. 24, 1975

[21] Appl. No.: 634,962

[52] U.S. Cl. .............................. 179/41 A; 325/53; 325/55
[51] Int. Cl.² ......................................... H04Q 7/00
[58] Field of Search .......... 179/41 A, 18 D, 18 EA, 179/15 AS, 15 BZ; 325/51, 53, 55, 57; 343/176, 177

[56] References Cited

UNITED STATES PATENTS

| | | | |
|---|---|---|---|
| 1,852,727 | 4/1932 | Van Der Horst | 179/15 AS |
| 2,680,154 | 6/1954 | Dorff | 325/53 |
| 3,513,264 | 5/1970 | Baer | 325/55 |
| 3,663,762 | 5/1972 | Joel, Jr. | 325/51 |
| 3,786,199 | 1/1974 | Rimbach, Jr. | 179/41 A |
| 3,943,444 | 3/1976 | Lundberg | 325/55 |
| R23,313 | 12/1950 | Mitchell | 179/15 AS |

*Primary Examiner*—Kathleen H. Claffy
*Assistant Examiner*—Gerald L. Brigance
*Attorney, Agent, or Firm*—Victor Myer; James W. Gillman

[57] ABSTRACT

A communication system of the type wherein a central station assigns a limited number of information channels to a requesting one of a plurality of remote stations is disclosed. The requesting station sends its identification signal along with the request signal to the central station on a signal channel. The central station classifies the requesting station in either a priority or a nonpriority queue. The priority queue corresponds to those stations which are continuing an on-going interchange, whereas the nonpriority queue contains those stations which wish to initiate an interchange. Stations are prioritized in the queues on a first-in/first-out basis.

The central station constantly monitors the information channels and, as channels become available, assigns the channels first to stations in the prioirty queue, then to nonpriority queue stations. A channel becomes "available" when the central station detects a pause, such as a momentary release of a push to talk microphone switch, in transmission on that channel. By this transmission trunking method, the system makes optimum use of the limited number of available channels.

Additional central station processing provides an acknowledgement signal, which indicates that the request was received and a channel will be assigned as soon as one becomes available. Also, the identification of a requesting station is compared with an associate memory. The memory provides the identifications of all stations to whom the requesting station would transmit. Once a channel is available, it is assigned to the requesting station and to its associated stations, whereby the associated stations are notified of, and prepared for, the impending transmission.

40 Claims, 8 Drawing Figures

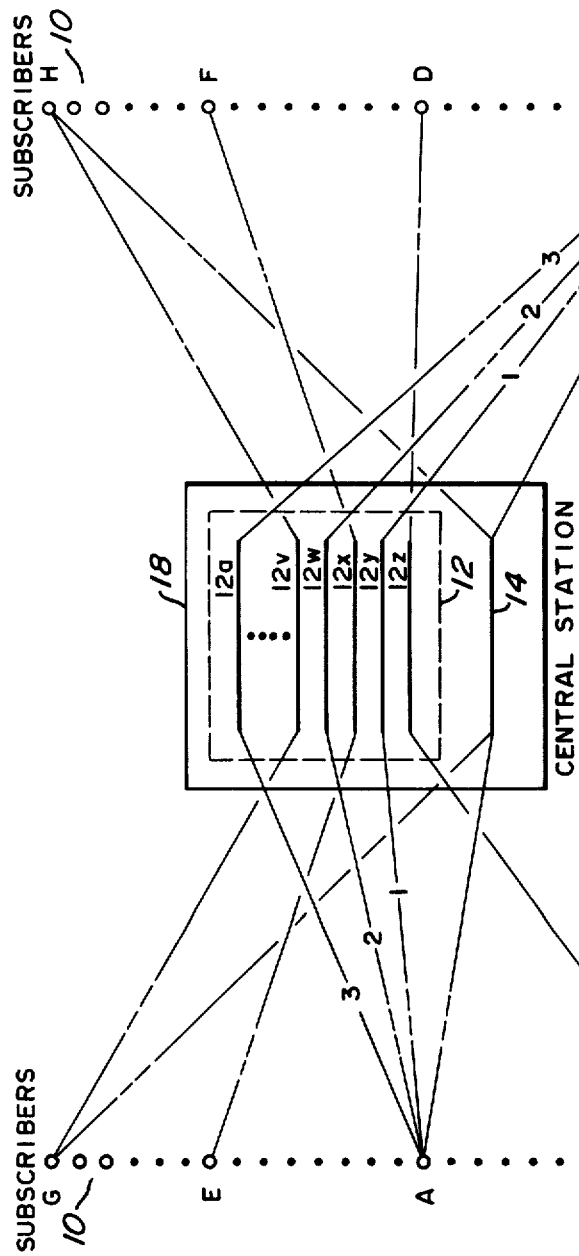

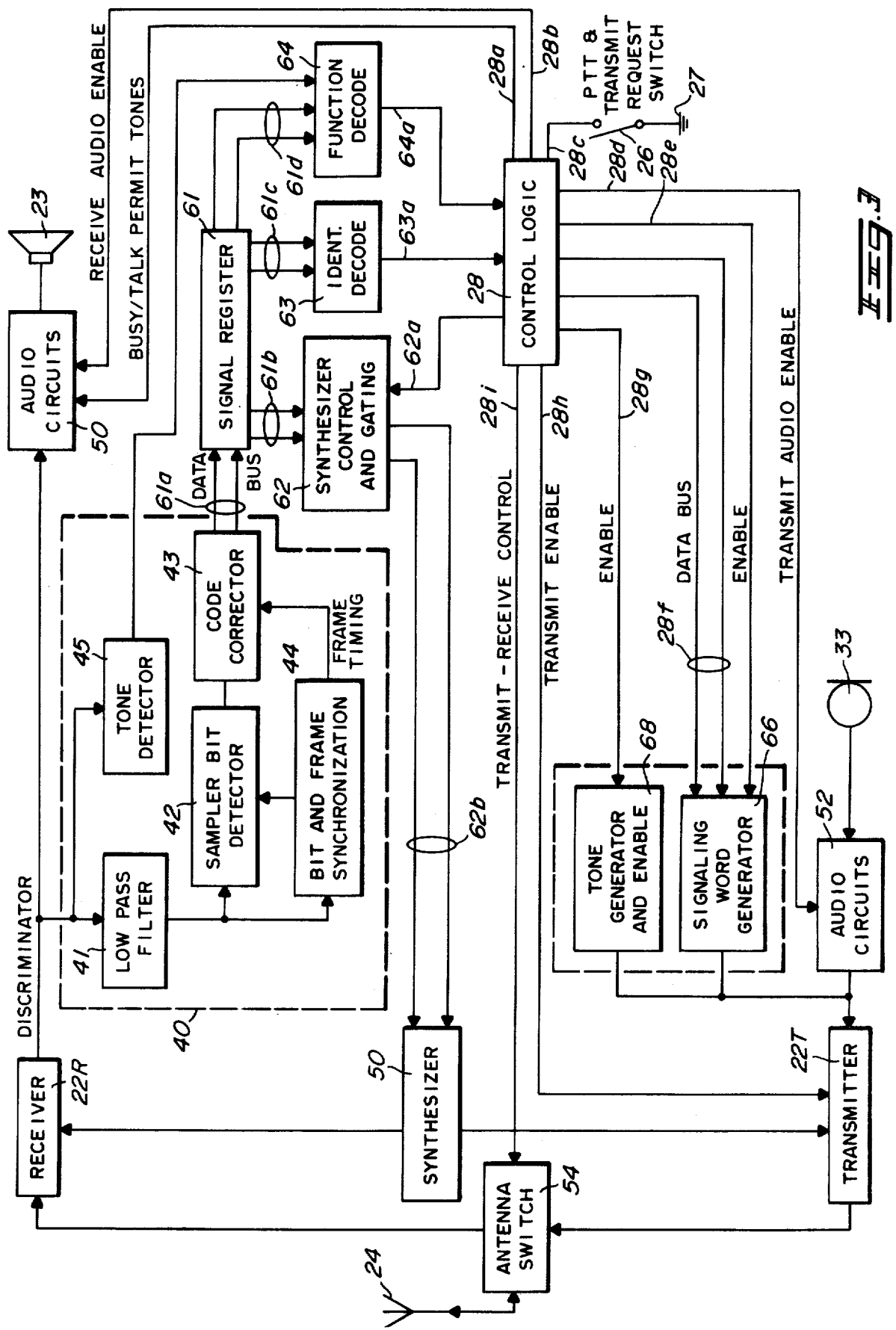

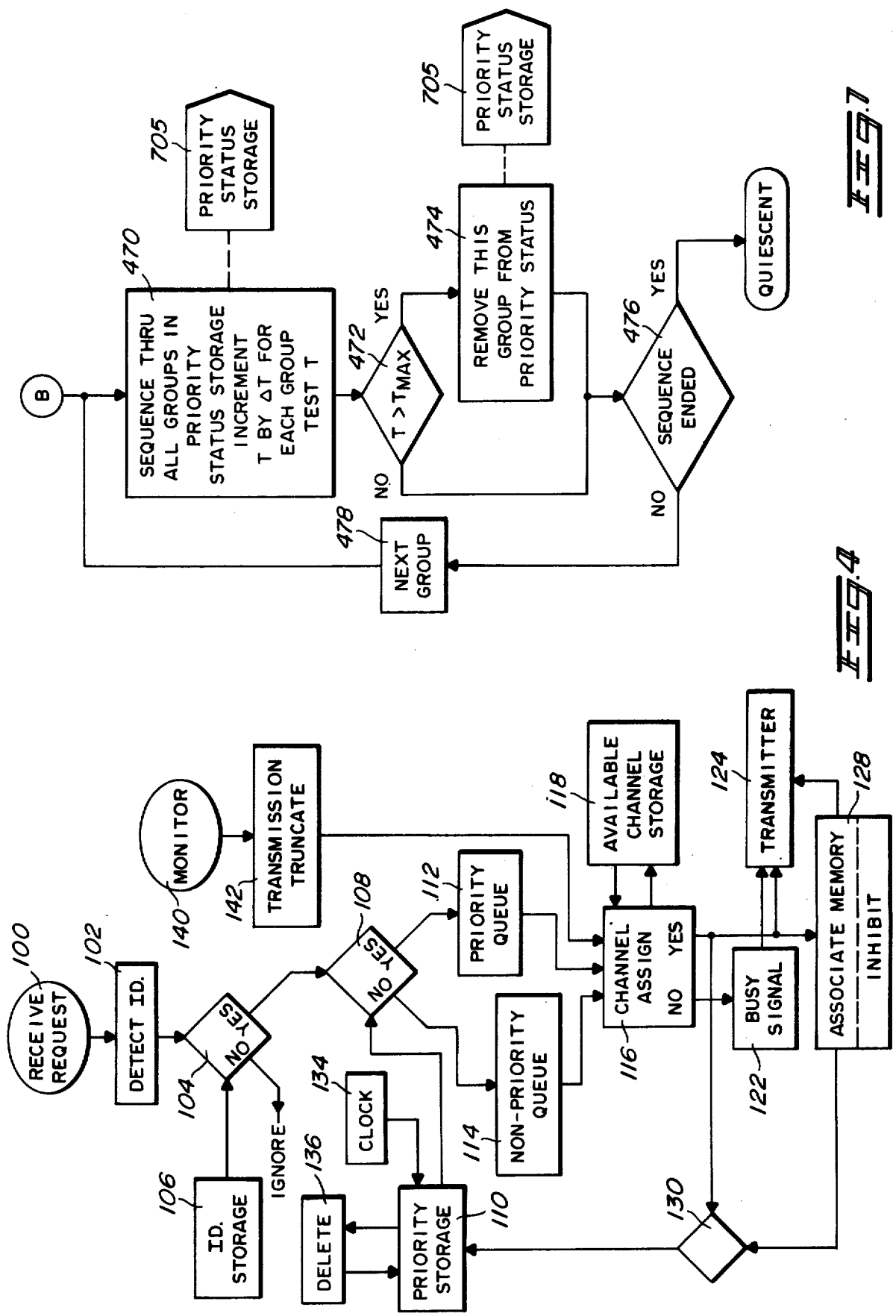

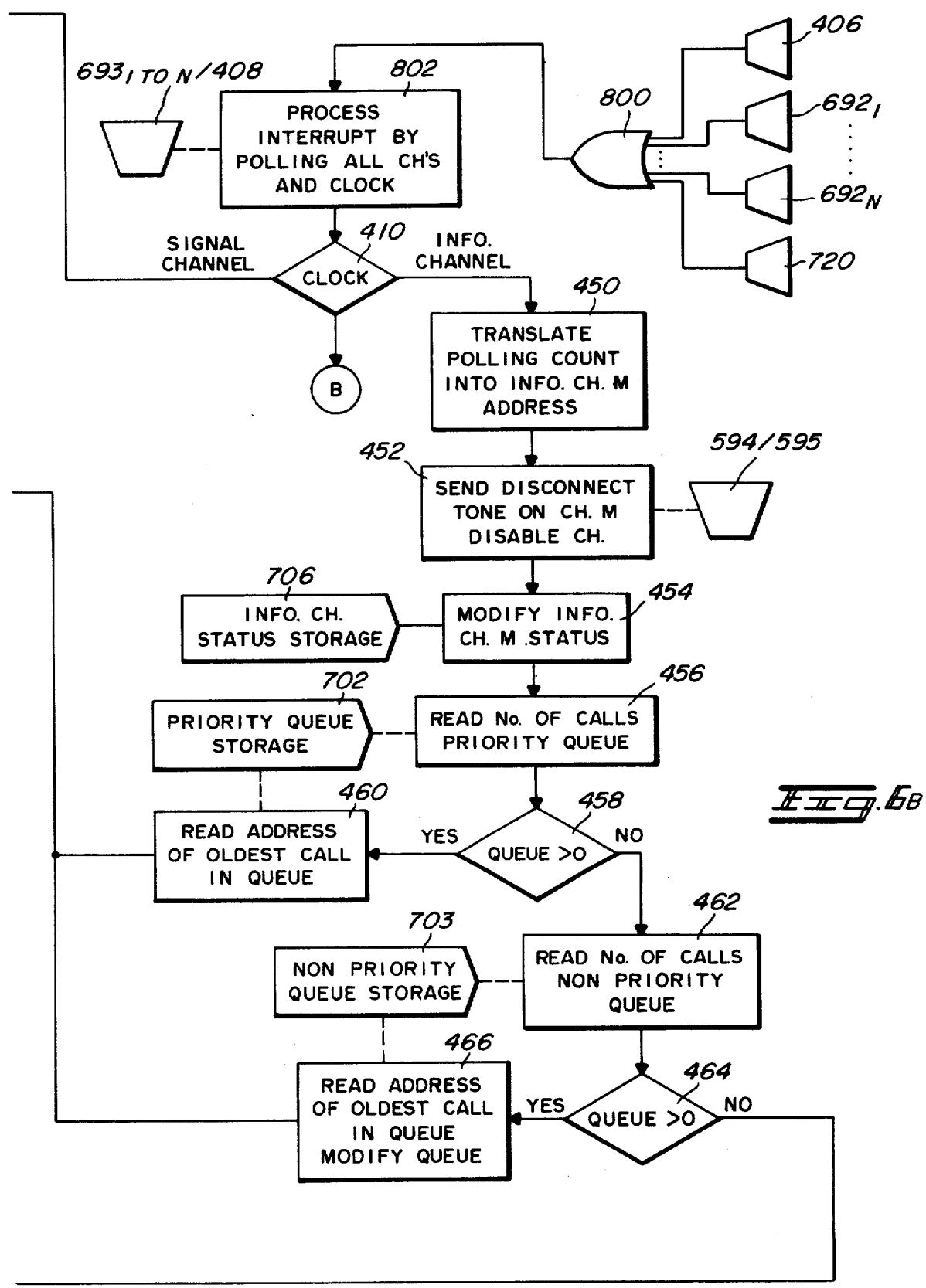

TRANSMISSION TRUNK MULTICHANNEL DISPATCH SYSTEM WITH PRIORITY QUEUING

BACKGROUND OF THE INVENTION

This invention relates to multichannel communication systems and, more particularly, to such systems having transmission trunked channel assignment and requesting station priority queues.

Trunked communication systems are well known in the telephone and mobile communication art. In such applications, a multiplicity of subscribers share a limited number of transmission channels. The channels are assigned to subscribers by a central dispatch station. Commonly, the central station dedicates a channel to a subscriber for the duration of an entire interchange message, hence, the name "message trunking".

The message trunked systems suffer from numerous disadvantages. First, once a subscriber is assigned a channel he gains full control over it. Even though numerous others are waiting for channel assignments, he may conduct a lengthy message with lengthy pauses. Moreover, at the conclusion of his message he may forget to return the channel to central station control. A further disadvantage to such systems is that if a subscriber initiates a call during a period when all channels are in use, he is not placed in a priority queue, but rather he must reinitate the call at a later time. Thus, it is possible that a latecomer could be assigned a channel before a subscriber who has made a prior request.

OBJECTS OF THE INVENTION

It is an object of the present inventon, therefore, to provide an improved trunking system which assigns a channel to a subscriber for only so long as his actual transmission.

It is a further object of the invention to provide an improved trunking system of the above type which gives the user a sense of system loading.

An additional object of the present invention is to provide an improved trunking system of the above described type which provides priority queues for its subscribers.

Basically, according to the invention, control apparatus is provided for a communication system having a central control station which assigns a limited number of information channels among a plurality of remote sections. In the remote station, the apparatus comprises means for requesting a channel assignment from the central station, and further means responsive to an assigned channel signal from the central station whereby the remote station operates on the assigned channel. In the central station, the apparatus comprises means which detect the conclusion of a transmission by a remote station on its assigned channel and truncates the assignment of the channel to said station in response to the detected conclusion.

Additional central station apparatus predeterminedly prioritizes the requesting remote stations and assigns available channels to the remote stations in the priority order.

BRIEF DESCRIPTION OF THE DRAWINGS

FIG. 1 is a generalized representation of a transmission trunking system according to the invention;

FIG. 2 illustrates a communication between two remote stations via the transmission trunking technique;

FIG. 3 is a detailed block diagram of a remote station;

FIG. 4 is a logic flow diagram of the central control station;

FIGS. 6a, 6b and 7 are logic flow diagrams of the microprocessor unit utilized in the central station.

DESCRIPTION OF THE PREFERRED EMBODIMENTS OF THE INVENTION

Figure 5:
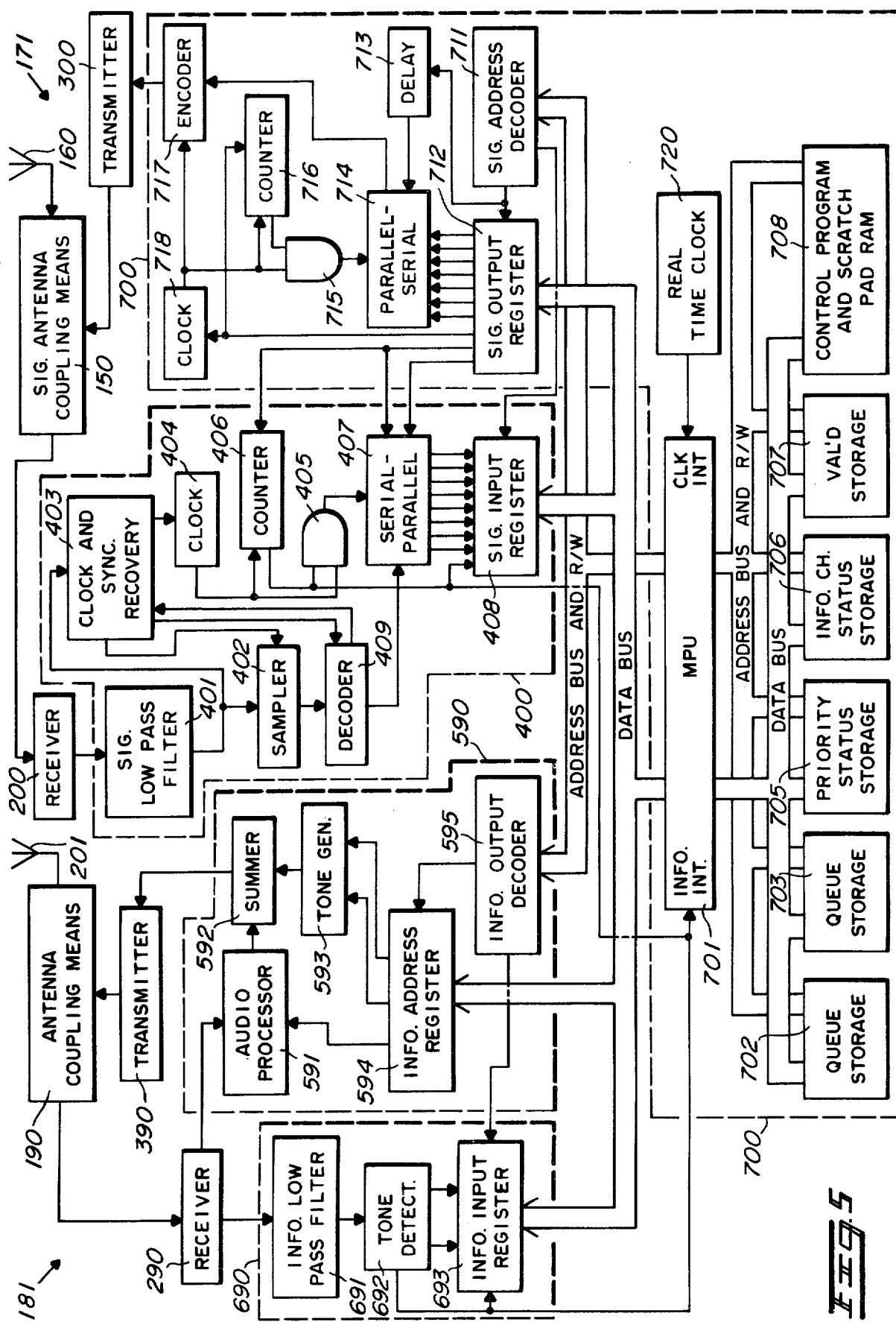
FIG. 5 illustrates implementation of the central station in block diagram form.

In FIG. 1, a plurality of subscribers 10 are shown, all of which share a limited number of transmission information channels 12 and a signal channel 14. The channels 12, 14 are controlled by a central station 18. In particular, communication is shown between subscribers A and B, C and D, E and F, and G and H.

System operation is understood with reference to the subscriber A to subscriber B communication. Assuming subscriber A initiated the call, his first transmission would be on the signal channel 14 to the central station 18. Central station 18 decodes the request message, and determines the identity of the subscriber. Then, central station 18 determines whether an information channel 12 is available. If it is, the requesting station A will be assigned a channel. If not, station A will be placed in a priority queue whereby as channels become available they are assigned to stations having the highest priority. If all channels are being used, the central station will send an acknowledgement signal to station A indicating that it has received the request signal and that a channel will be assigned as soon as one becomes available.

Central station 18 is also provided with an associative memory, whereby the identification of the requesting station, in this example station A, is associated with the station to which the requesting station will communicate, e.g. station B. Thus, when an information channel 12y becomes available, the central station 18 sends an appropriate signal on signal channel 14 to both station A and station B. The signal to station A indicates that transmission may proceed, whereas the signal to station B actuates control circuitry within station B which inhibits transmission and tunes the station B receiver to channel 12y.

The transmission from station A to station B over information channel 12y is monitored by central station 18. Once station 18 detects an end of transmission by station A, channel 12y is automatically made available for assignment to another requesting station. Thus, when station B responds to station A, it must first request an information channel on signal channel 14. Since the transmission from station B to station A is a continuation of a prior conversation, central station 18 will have assigned a high priority to station B, such that station B must wait a very short time, if at all, for channel assignment. As before, once a channel is assigned, in this case channel 12w, an appropriate message is sent by central station 18 on signal channel 14 both to station B and station A whereby B may then proceed with his transmission.

In this manner, central station 18 transmission trunks each broadcast by a station on an assigned channel whereby the channel is available for reassignment as soon as the transmission ceases. Also, stations requesting a channel are assigned priorities. If a station is initiating a communication, it is assigned a low priority state, whereas stations which are involved in an ongoing conversation are assigned a relatively high priority state. Thus, the central station has full control over the information channels and is free to assign them in a manner which yields optimum communication flow.

FIG. 2 illustrates the communication system according to the invention as used in a mobile radio application. A central or base station 12 controls communication between a first mobile unit 20 (Mobile I) and a second mobile unit 30 (Mobile II). Each mobile 20, 30 is provided with a transceiver 22, 32 which couples to an antenna 24, 34, a push to talk switch 26, 36, a status indicator 27, 37 and a control logic 28, 38, respectively.

Assuming that Mobile I desires an information channel for communication to Mobile II, push to talk switch 26 is depressed whereby the control logic 28 generates a signal $S_1$ containing channel request and, in conjunction therewith, station identification encoded information. The signal $S_1$ is transmitted via transceiver 22 over antenna 24 to central station 12 on the signal channel. The central station 12 includes processing circuitry which identifies the requesting station, and assigns a priority in response thereto. Since Mobile I is initiating communication, it will be assigned a relatively low priority state.

In response to the request portion of signal S1, central station 12 transmits a response signal S2 on the signal channel to Mobile I. If all information channels are in use, response signal S2 will contain acknowledgement encoding, whereby control logic 28 locks transceiver 22 in the receive mode on the signal channel, and activates status indicator 27 whereby the operator of Mobile I is notified that all lines are busy but that he will be assigned a channel as soon as one becomes available.

For those systems in which a particular requesting station will always be calling a particular group of mobile stations, as for example a dispatcher calling his fleet, the central station 12 is provided with an associate memory. The associate memory is programmed to recall the identity of stations to whom a requesting station wishes to communicate. Thus, referring to FIG. 2, once an information channel becomes available for assignment to Mobile I, central station 12 sends an appropriate signal $S_2$ which enables the control logic 28 to activate transceiver 22 to the transmit mode on the assigned channel. Also, status indicator 27 indicates to the operator that the system is ready to carry his message. In addition, the central station sends a signal $S_3$ to the Mobile II station. The encoding of signal $S_3$ enables the Mobile II control logic 38 to inhibit the transmitter portion of transceiver 32, and to activate the receiver of transceiver 32 to the assigned channel. While $S_2$ and $S_3$ are shown as independent signals, it should be clear that they may be encoded within a single signal.

Thereafter, the operator of Mobile I can send a transmission $S_4$ to mobile II over the assigned channel, with the central station serving as repeater. This transmission is monitored by the central station 12, and, when the station detects the end of Mobile I transmission, as, for example, when the operator releases push to talk switch 26, the central station automatically makes the assigned channel available for other stations.

Should Mobile II desire to transmit back to Mobile I, it also would request a channel assignment on the signal channel from central station 12. Since central station 12 has assigned both Mobile I and its associated station Mobile II to a priority queue, Mobile II would ordinarily have a very short wait for channel assignment.

Since each station in the communication system according to the invention must be assigned an information channel upon every transmission, the wait for an assignment experienced by the stations gives them an indication of system loading, and, hopefully, induces them to restrict the length of their messages.

FIG. 3 is a detailed block diagram of the Mobile I station of FIG. 2. Identical numbers have been used to indicate the same components.

Antenna 24 is coupled via antenna switch 54 to either receiver 22R or transmitter 22T. The discriminator output of receiver 22R is amplified through audio circuits 50 and applied to a speaker 23. Also, the discriminator output of receiver 22R is routed through processing circuitry 40, and applied through parallel line 61a to a signal register 61. Signal register 61 provides parallel outputs 61b, 61c, and 61d to a synthesizer control and gating block 62, an identification decode block 63, and a function decode block 64. Each block, 62, 63, 64 couples to a control logic block 28 via lines 62a, 63a and 64a, respectively. Parallel lines 62b couple from the synthesizer control and gating block 62 to a frequency synthesizer 50. The synthesizer 50 provides a controlled local oscillator signal to both receiver 22R, and a transmitter 22T.

The logic control 28 provides first and second output lines 28a, 28b to the audio circuits 50. First output line 28a passes control tones which indicate to the mobile operator that a requested information channel is either unavailable, or that it is available and he may proceed in transmission. The second line 28b enables the audio circuits whereby the receiver 22R output is reproduced through the speaker 23. A third line 28c from control logic 28 connects through the push to talk switch 26 to circuit ground 27. The push to talk switch 26 is integral with a microphone 33 which connects through audio amplifier circuits 52 to the transmitter 22T. The audio circuits 52 are enabled by an output line 28d from control logic 28. Additionally, control logic 28 provides an output 28e, and parallel outputs 28f, to a signalling word generator 66. The signalling word generator 66 provides an output control to transmitter 22T, as does a tone generator and enable block 68 which is also controlled from a control logic output 28g. Finally, control logic 28 provides a transmit enable output on line 28h to transmitter 22T, and a transmit receive control line 28i to the antenna switch 54.

Mobile operation is understood as follows. When the operator wishes to initiate a call, he depresses push to talk switch 26 which, via line 28c, activates the control logic 28. Control logic 28 activates line 28whereby antenna switch 54 couples antenna 24 to the transmitter 22T. The signalling word generator 66 is enabled via an activated line 28e and, in response thereto, accepts commands on parallel lines 28f to generate a request signal and a unit identification signal which is unique to the Mobile I station. The signalling word generator adds parity bits and a reference synchronization signal to the tone code, which is thereafter passed to the transmitter 22T, now enabled via line 28h. Synthesizer 50 is in a mode whereby the transmitter 22T is tuned to operate on the signal channel. Thus, the encoded message is passed through antenna switch 54 and over antenna 24 on the signal channel to the central station (not shown). Once the message has been sent, the control logic 28 deactivates the transmit enable lines, returns the antenna switch 54 to the receive mode, and activates the receive enable lines whereby the system awaits a response from the central station.

In the receive mode, the signal is passed from antenna 24 through switch 54 to the receiver 22R. The synthesizer 50 normally tunes receiver 21 to receive signals on the signal channel. The discriminator output of receiver 21 is low pass filtered via filter 41 and processed through sampler bit detector 42, bit and frame synchronization circuitry 44, code correction circuitry 43, and tone detector 45, all of which are well known in the art.

All signals are processed through the signal register 61. Both the identification and function portions of each signal are sent to the identification decoder 63, and function decode 64, via lines 61c and 61d, respectively. A comparison is made between the received identification and the unit's assigned identification, which identification can consist of individual and group segments. If a match is found the signal is sent to the control logic 28, where the function decoding is also received. In response to the address and function signal, control logic determines whether the requesting unit is to be activated on the assigned channel. A signal on line 62a gates the synthesizer control block to decode the channel assignment portion of the signal and activate and tune the synthesizer corresponding to this assignment.

Once the control logic 28 receives an information channel assignment, it determines whether the push to talk switch 26 is depressed. If the switch 26 is depressed, the logic 28 responds by assuming that this is the mobile wishing to transmit. Therefore, it activates transmit enable signals on lines 28d, 28h, and activates line 28i to operate antenna switch 54 in the transmit mode. Finally, a talk permit tone is sent via line 28a to the audio circuits 50, whereby the operator is notified that he may proceed with transmission.

If, however, when a channel assignment code is received by the control logic 28 and push to talk switch 26 is not depressed, the receive audio enable line 28b is activated whereby the system locks the in the receive mode. If an identification decode signal is detected through the decoder 63, the control logic activates the synthesizer 50 to the assigned channel via line 62a, synthesizer control 62, and parallel lines 62b. Without a proper output from the identification decoder, the synthesizer 50 maintains the receiver 22R tuned to the signal channel.

If all information channels are in use, the central station sends a function decoding signal to the mobile so indicating. The function decoding signal is processed through the receiver, in processing circuitry 40, and is detected by the function decoder 64. The control logic 28 inhibits mobile transmission, and maintains the system in the receive mode tuned to the signal channel. Also, a "busy" tone is sent on line 28a to the audio circuits 50. The characteristic busy tone is reproduced by the speaker, thereby notifying the operator that a channel is not open for his transmission.

Once a signal word is receiver which indicates a channel assignment, the control logic determines whether the push to talk switch 26 of this mobile had been depressed. If it is, a connect tone is passed to the tone generator enable block 68 and is transmitted on the assigned frequency.

At the conclusion of his transmission, the mobile operator releases push to talk switch 26, which causes the control logic 28 to activate the tone generator 68 and send a disconnect tone to the base. Thereafter, control logic 28 returns the system to the receive mode tuned to the signalling channel.

FIG. 4 is a simplified flow diagram of the signal processing in the central station. A mobile information channel request message is received at block 100 and passed to an identification detector 102. Detector 102 decodes the input signal, and produces at its output the unique identification signal of the requesting station. A gate 104 compares the identification of the requesting station with those identifications in identification storage register 106. If an identification storage signal corresponding to the requesting station identification signal cannot be found in storage 106, gate 104 causes the central station to ignore the incoming message. Should the identification storage register 106 contain a signal corresponding to the identification of the requesting station, this identification signal is passed to a second gate 108. Gate 108 determines whether the requesting station is located in the priority storage register 110. If it is, the identification signal is passed to the priority queue 112; and, if it isn't it is passed to a non-priority queue 114. Both queues 112 and 114 assign a priority to incoming identification signals based on a first-in/first-out basis.

The priority queues 112, 114 feed to a channel assign block 116. Channel assign block 116 constantly monitors an available channel storage register 118. As information channels become available for assignment to requesting stations, the channel assign block 116 sequentially makes assignments to waiting stations in the priority queue 112. Channel assignments are given to stations in the nonpriority queue 114 if, and only if, there are no stations waiting assignment in priority queue 112. If the channel assign block 116 cannot immediately assign a channel to a requesting station, a busy signal generator 122 is activated, which in turn sends a busy signal via a transmitter 124 to the requesting station.

When a channel is available for assignment to a requesting station, an appropriate signal is sent via the channel assign block 116 through the transmitter 124 to the station. Also, an associate memory and inhibit block 128 compares the identification signal of the requesting station to corresponding signals in the associate memory. The particular memory signals which correspond to the channel request station represent stations to whom the requesting station wishes to transmit once it is assigned a channel. Thus, associate memory and inhibit block 128 causes transmitter 124 to broadcast a signal to each of the particular stations which in turn causes them to tune to the assigned channel, and inhibit any transmission on their part.

Further, when a channel is assigned to a requesting station, a third gate 130 enters the requesting station's identification signal, along with its particular associate stations' identifications, in priority storage 110. Thus, once a communication has been initiated, the requesting station and the particular stations are stored in the priority storage, and applied to the priority queue 112 when any of these stations subsequently request a channel. Since the channel assign block 116 gives priority to priority queue stations, the members of an ongoing communication are assured of a very short wait for channel assignment.

Stations are deleted from priority storage 110 via a delete block 136. This block monitors all identified and detected identification signals of requesting stations. In combination with a clock 134, the delete block 136 determines the time between channel request of various stations. If a requesting station and its particular associated stations, do not request a channel for a given period of time measured from a prior request, the assumption is made that the parties have ceased their interchange, and their identification signals are deleted from the priority storage 110.

The central station has a monitor 140 which constantly monitors the information channels. A transmission truncate block 142 detects the conclusion of a transmission by a requesting station on its assigned channel, and in response thereto truncates the channel assignment, making the channel available for assignment to other requesting stations. When used in conjunction with the mobile station described with respect to FIG. 3, the transmission truncate block 142 responds to end of message signals which are generated by the mobile upon release of the push to talk switch, or absence of carrier. In particular applications, the transmission truncate block 142 might contain audio detection circuitry which would sense a sufficiently long pause in a transmission and thereby cause a truncation of channel assignment.

FIG. 5 is a block diagram representation of the central station, which is comprised of both signal channel 171 and audio channel 181 processing circuitry. While circuitry for a single audio channel is shown, it should be understood that duplicate circuitry for each audio channel is contemplated.

The central station signalling channel transceiver, comprised of a receiver 200 and a transmitter 300, operates in a full duplex mode with both receiver and transmitter active at all times.

In the receive mode, signals are passed from antenna 160 through an antenna coupler 150 to the receiver 200. The discriminator output of the receiver 200 couples to signal channel receiver processing circuitry 400. Processing circuitry 400 closely resembles the mobile processing circuitry 40 discussed with respect to FIG. 3. The receiver 200 output is low pass filtered by receiver block 401 and passed to a sampler 402. The sampler 402 responds to a bit synchronization output of clock and synchronization recovery block 402, which also connects to the receiver 200 output, to sample incoming bits and pass them to a decoder block 409. Indication of a received frame of bits is sent from the frame synchronization recovery unit 403 to the decoder 409. If the received work can be decoded correctly, a clock enable signal from the clock and sync recovery block 403 activates clock 404. Clock 404, through the action of gate 405 and counter 406, transfers the decoded data from the decoder 409 into a serial to parallel conversion register 407. When the word is transferred completely, an interrupt signal is generated in the counter 406, which interrupt signal is applied to a signal input register 408 to which the word transferred. The counter 406 interrupt signal is also passed to a microprocessor unit 701. The microprocessor 701 is the control logic for the central station. It responds to interrupt signals in a predetermined manner to selectively recall or store information in one or more of a series of storage registers 702–708 via a data bus and an address bus.

For example, if an interrupt signal has been generated by a channel requesting signal the microprocessing unit 701 first reads the identification of the calling group which is stored in the signalling input register 408. It then scans through the validation storage block 707 and determines whether the identified signal is among the list of addresses of valid users stored in the block. If the requesting station identification is contained in the address of validation storage block 707, signal processing continues. If the requesting station identification is not among the valid addresses, the microprocessing unit returns to a quiescent state ready to receive a subsequent interrupt signal.

Upon receipt of a matched validation between validation storage block 707 and requesting station identification, the microprocessor 701 addresses the information channel storage block 706. A count of the number of unused information channels is read from block 706 to the microprocessor 701. If the count is greater than zero, a channel is assigned. If, however, the count equals zero, no channels are available, and the call must be queued in one of the queue storages 702, 703.

The operation of the microprocessing unit 701, especially with respect to the assigning process, is discussed more fully with reference to FIG. 6.

Output command signals from the microprocessing unit 701 are processed through transmitter processing circuitry 700. The transmitter processing circuitry is comprised of a signal output register 712 which connects to a parallel-serial block 714. Command words from the microprocessing unit 701 are passed via a data bus to the signal output register 712, and thereafter are clocked through the parallel-serial block 714 to an encoder 717. Additional address commands are passed via the microprocessing unit 701 by way of an address bus to a signal address decoder 711 which also connects to the signal output register 712 and provides an enable signal therefor. An enable signal for the parallel-serial block 714 is generated by the output register 712 and delayed through a delay block 713.

The command signal output is bit and frame synchronized by a clock 718 in conjunction with a gate 715 and a counter 716. The clock receives a start signal from output register 712, and thereafter increments the synchronization circuitry as well as the encoder 717. The encoder 717 output is passed via the transmitter 300 and antenna coupler 150 to the antenna 160.

Finally, a real time clock 720 (periodically) produces microprocessor interrupt signals which initiate priority queue updates, a process more fully discussed hereinbelow.

The base audio channel processing circuitry is understood as follows. Attention is first drawn to the receiver portion (blocks 290 and 690). Signal reception is accomplished by means of an antenna 201 from which the signal passes to the antenna coupling means 190, and therethrough to the receiver 290. At this point the signal is demodulated and split into two paths. The voice portion is sent to the audio processor 591 from which voice can be passed or blocked. This is explained in detail hereafter.

The second path consists of one of two tones, connect or disconnect. From the receiver 290 these tones pass through a low pass filter 691 to a tone detector 692. The tone detector monitors the channel for the presence of either a connect tone or a disconnect tone and alerts the MPU 701 in the event of either a connect tone drop which lasts for a predetermined interval, the lack of a connect tone for a predetermined interval after the channel is assigned or the presence of a disconnect tone. The MPU 701 is alerted by the information interrupt line which originates at the tone detector 692. In the event of an interrupt, the information interrupt signal also enables an information input register 693 to accept data from the connect drop and disconnect lines.

Upon reception of the interrupt, the MPU 701 in the process of poling all input devices sends out on the address bus the identification of the information input register 693. An information address decoder 595 interprets the address and enables the output gates of the information input register 693. This places the information input register 693 information on the data bus which is subsequently accepted by the MPU 701.

Next, consider the transmitter control section (i.e., block 590). The transmitter is controlled by placing the identification of an information output register 594 on the address bus. The information address decoder 595 decodes the identification and enables the information output registe 594 to accept information from the MPU 701 which is on the data bus. This information provides the connect or disconnect enable signal to the tone generator 593 and/or the enable or enable to the audio processor 591.

The connect, disconnect signal determines which tone, if any, is to be sent by the tone generator 593. The enable signal allows audio to be passed (or blocked in the event of enable) to a summer 592. At the summer 592 the signals from the audio processor and tone generator are combined and passed to the transmitter 390 whereat the resulting signal is modulated on the RF carrier, amplified and passed to the antenna 201 through the antenna coupling means 190.

Figure 6A:
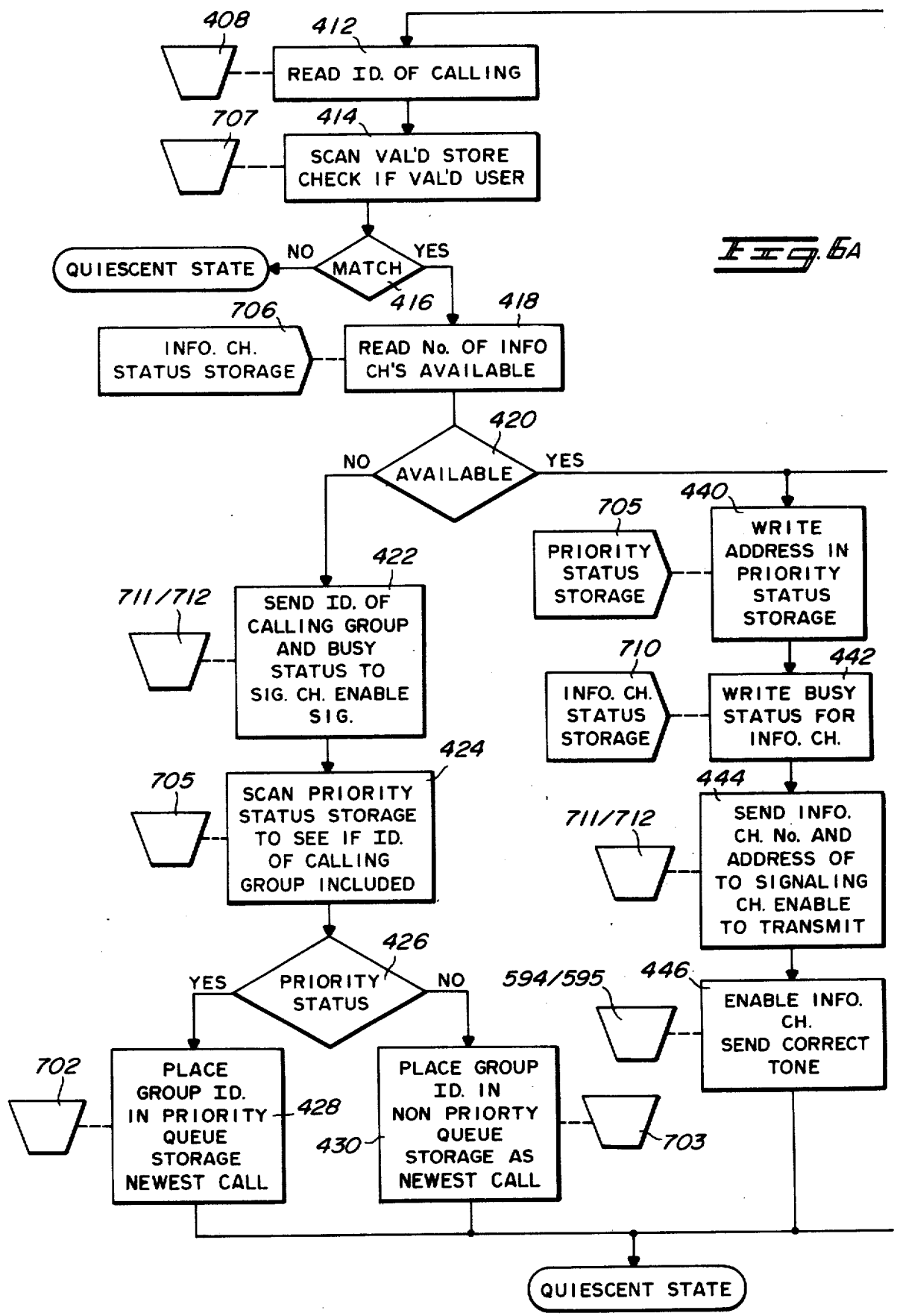

FIGS. 6a, b are flow diagrams of the microprocessor unit 701 shown in the central station block diagram of FIG. 5.

Microprocessor activity is induced every time it receives an interrupt signal. The interrupt signals are passed through an OR gate 800 and applied to a process interrupt block 802. An interrupt signal will be of one of three types. It may arise through the signalling channel at block 406, upon receipt of a correctly decoded signal request message which is discussed with respect to FIG. 5. A second type of interrupt signal arises through the presence of a connect or disconnect tone on one of the audio channels $691_1$ to $691_N$, described more fully hereinbelow. The third type of interrupt signal at block 720, is derived from clock timing of a real time clock. An interrupt signal of this type results in the timing required of various functions in the system.

Once the processor interrupt block 802 receives an interrupt signal, it sequentially polls the status of each channel, including the signalling channel, in a channel input register 408 and each information channel, in input register 693, thereby determining which channel has carried the input message. A gate 410 passes the interrupt signal to a first signal path if the signal is detected as originating on the signal channel. This path leads to a block 412 which via register 408, reads the identification of the requesting station, and feeds this identification to a scan validation block 404. Validation block 414 compares the identification signal to the signals stored in a validation storage block 707 and determines whether the requesting station signal is among the addresses in the validation storage block. If it is not a gate 416 returns the system to its quiescent state whereby it is prepared to receive a subsequent interrupt signal. If, however, the requesting station is identified as being among those in the validation storage block 707, the information is passed to a processing block 418. Block 418 reads the number of available information channels from an information channel storage register 706. If no channels are available, i.e. if the number of available information channels is zero, gate 420 activates an acknowledgement block 422. Acknowledgement block 422 addresses the signalling channel address decoder, block 711, and the signalling output register 712. This process enables the signalling channel and transmits the busy message to the requesting station. Thereafter, a scan priority storage block 424 scans the priority status storage block 705 to see if the identification of the requesting channel is in storage. Each identification within storage block 705 is sequentially compared with the identification of the requesting station. A determination is made in each case of match or no match. If a match is made, indicating priority, a gate 426 passes the identification to a transfer block 428 which in turn assigns the identification signal to the lowest priority state 702 of the priority queue. In a no match condition, gate 426 routes the identification signal to a transfer block 430 which in turn passes it to the lowest priority state 703 of the nonpriority queue. Having completed priority queue assignment, the system returns to the quiescent state.

Referring back to gate 420, if the number of information channels available is greater than zero, gate 420 passes the identification signal to block 440. At block 440 the address of the requesting station is written in the priority status storage 705. Block 440 also includes means for determining the last time a channel request signal was received from a station in the call group. Each time an address is written into the priority status storage 705 by address block 440 the time is reset to zero. Block 440 activates block 442 which addresses the information channel status storage 710. At this point, the available channel which is to be assigned is changed to the busy state in the information channel status storage 710.

Following block 442, a block 444 sends the identification of the information channel to be assigned, and the address of the calling group to the signal address decoder 711 and signal output register 712. An enable block 446 causes a connect tone to be generated which is sent to register 594 and decoder 595 of the information channel being assigned. Thus, the entire message of the assigned channel and connect tone are sent to appropriate calling group stations. Thereafter the system returns to the quiescent state.

If an interrupt signal originates on one of the information channels, this is an indication that the transmission on the channel has ceased. Therefore, gate 410 activates block 450 which in turn locates the address of the previously assigned information channel. A subsequent block 452, via register 594 and decocer 595, causes a disconnect tone to be generated which notifies all units to leave the channel and disables audio processor 591 whereby the previously assigned channel now becomes available for reassignment. Thus, block 454 which couples to the information channel storage 706 causes the status of the identified channel to change from busy to available.

Thereafter block 456 reads the number of calls stored in the priority queue storage 702. If the number of calls in the priority queue is greater than zero, a gate 458 activates a read address 460 which reads the identification signal of the call group having the highest priority in the priority queue 702. The identification of this call group is then passed to the channel assigning sequence, blocks 440-446 whereby the available channel is assigned to this group.

If the priority queue is empty, gate 458 activates block 462 which reads the number of requests in the nonpriority queue 703. If there are stations awaiting an information channel in the nonpriority queue, a gate 464 activates block 466 which reads the identification of the highest priority call in the nonpriority queue storage 703, routing this identification signal to the channel assigning sequence block 440-446, as before. If there are no stations awaiting assignment in the nonpriority queue, the system returns to it quiescent state.

The third source for an interrupt signal is from a real time clock 720. In this mode, gate 410 passes the interrupt signal down a third logic path B, which is more fully described with reference to FIG. 7.

The real time clock 720 generates an interrupt signal every 100 milleseconds. This signal activates a sequencing block 470 which address the priority status storage 705 and increments each call group in the storage 705 by one time unit. It should be recalled that the discussion of block 440 in FIG. 6 indicated that each time a member of a call group requested a channel, the time increment corresponding to that group in the priority status storage is returned to zero. At each clock interrupt interval, the priority status storage 705 is updated as to the number of time increments occurring since a member of a call group last requested an information channel. The total time increment since the last channel request of each call group is compared with a maximum, typically one to two seconds, in gate 472.

If the time interval of a group exceeds the allowed maximum gate 472 activates logic block 474 which addresses the priority status storage 705 and deletes the instant call group from storage. Thereafter a gate 476 determines whether each call group in the priority status storage 705 has been sequenced. If they have, the system is returned to the quiescent state. However, if there are remaining elements in storage to be sequenced, gate 476 activates block 478 which feeds back to block 470 thus sequencing to the next storage call group. Should a particular call group have a time increment less than the maximum, gate 472 directly activates the sequence gate 476.

In certain applications it may be desirable to remove call groups from the priority status once their communication has accumulated a particular number of transmissions. A logic sequence very similar to that shown in FIG. 7 could be provided which would count each transmission of a call group, comparing the total count of each group with a maximum. If the transmission count of a particular call group was greater than the maximum, this group would be removed from priority storage.

In summary, a multichannel dispatch communication system has been described which assigns a priority queue to requesting stations awaiting channel assignment, and which provides automatic transmission trunking whereby maximum utility is gained from the limited number of available channels.

While a preferred embodiment of the invention has been described in detail, it should be understood that many modifications and variations are possible, all of which fall within the true spirit and scope of the invention.

For example, in high density user areas of plurality of signalling channels might be required to provide adequate system flow.

In addition, some applications might require more than two priority queues, a requirement for which the instant system may be easily adopted.

We claim:
1. Control apparatus in a communication system having a central control station for assigning a limited number of information channels to a plurality of remote stations, each of said remote stations communicating a message, comprising a plurality of individual transmissions, on its assigned channel, the apparatus comprising:
  each remote station having
    means to request a channel assignment from the central station;
    means responsive to an assigned channel signal to operate on said channel;
    means generating an end of transmission signal at the conclusion of each remote station transmission; and
  the central station having
    means to assign a channel to a requesting remote station; and
    means detecting the end of transmission signal from a remote station and truncating said remote station's channel assignment in response thereto.

2. The control apparatus of claim 1 wherein the central station channel assign means further comprises means to predeterminedly prioritize the remote stations requesting an information channel and assigning available channels in the priority order.

3. The control apparatus of claim 1 wherein each remote station further comprises
  identification signal means for sending a unique remote station identification signal to the central station in conjunction with the channel assignment request.

4. The control apparatus of claim 3 wherein the central station channel assigning means furthr comprises:
  a nonpriority storage register,
  a priority storage register;
  means for storing said remote station identification signals in said nonpriority storage register prior to channel assignment and in said priority storage register subsequent to channel assignment; and
  means assigning available information channels to those remote stations whose identification signals are in the priority storage register prior to assigning said channels to remote stations whose identification signals are in the nonpriority storage register.

5. The control apparatus of claim 4 wherein the central station assigning means further comprises
  means for assigning available information channels to remote stations whose identification signal is in the priority register on a first-in/first-out basis.

6. The control apparatus of claim 4, wherein the central station assigning means further comprises
  means for assigning available information channels to remote stations whose identification signal is in the nonpriority register on a first-in/first-out basis.

7. The control apparatus of claim 4 wherein the central station further comprises
  means for deleting a station identification signal from said priority register in response to the absence of a channel request signal from said requesting station for a predetermined time interval following said station's prior request.

8. The control apparatus of claim 1 wherein the central station further comprises
means responsive to a channel request by a remote station for detecting the absence of an available information channel and transmitting an inhibit signal to said remote station in response thereto; and
the more station further comprises
means for detecting said inhibit signal and inhibiting transmission by said remote station in response thereto.

9. The control apparatus of claim 7 wherein the remote station further comprises
an audible alert means for generating a distinct audible signal in response to said remote station receiving said inhibit signal.

10. The control apparatus of claim 1 wherein the central station further comprises:
associate means for associating, via a programmed memory, the requesting station with other particular remote stations to which said requesting station would transmit; and
means for sending a notification signal to said particular stations, said notification signal suitable for activating said particular stations to the channel assigned to said requesting station.

11. The control apparatus of claim 10 wherein said notification signal means further comprises
means for sending a transmission inhibit signal suitable for inhibiting transmissions of said particular stations; and
said remote stations comprise
means for receiving said notification signals and tuning to said assigned channel and inhibiting transmission in response thereto.

12. The central station of claim 10 wherein
the assigning means further comprises
means for transferring said associated particular station signals to the priority queue register,
whereby if one of said particular stations becomes a requesting station it will be given priority in channel assignment.

13. The central station of claim 12 wherein the assignment means further comprises
a priority queue deleting means for transferring a station identification signal out of the priority queue register responsive to the absence of a channel request from said channel request station and said particular stations for a predetermined time interval.

14. In a communication system having a central control station and a plurality of identifiable remote stations, the central station routing communications between remote stations over a limited number of identified information channels, communication between the remote stations and the central station occurring on a signal channel, each remote stations adapted for generating an end of transmission signal at the conclusion of its transmission, the central station comprising:
means for transmitting to the remote stations;
means for receiving transmissions from remote stations;
channel request responsive means, coupled to the receiver, sensing for the presence of a signal indicating a remote station request to transmit a message on an information channel;
station identification responsive means, coupled to the receiver, sensing the identification signal of said requesting remote station;
means for detecting and storing the identification signal of available information channels;
assigning means, coupled to the transmitter, and responsive to the request responsive means, for assigning an available channel to the requesting remote station, the assign means having
a. a nonpriority queue register for storing the identification of remote stations requesting an information channel,
b. a priority queue register for storing the identification of remote stations to which channels have been assigned, and
c. priority means for assigning available channels to the stations in the priority queue register before channels are assigned to stations in the nonpriority queue register, and
transmission trunking means, coupled to the receiver,
for detecting the end of transmission signal generated by a remote station on an assigned channel, and, in response thereto, transferring the identification of said channel to the information channel storage means such that the channel is available for assignment to another remote station.

15. The central station of claim 14 further comprising
inhibit means, coupled to the transmitter and to the information channel storing means for sending a transmit inhibit signal to a requesting remote station in response to the absence of an available information channel.

16. The central system of claim 15 wherein the inhibit means further comprises means for sending a signal suitable for activating the requesting station to the receive mode on the signal channel in conjunction with the transmit inhibit signal.

17. The central station of claim 14 further comprising associating means, coupled to the station identification responsive means, associating, via a programmed memory, the requesting station identification signal with particular identification signals of remote stations to which said requesting station would transmit when given an information channel.

18. The central station of claim 17 further comprising
notification means, coupled to the transmitter, the associating means, and the assigning means, for sending an assignment notification signal to said particular remote stations in response to the assigning means a chanel to a requesting remote station, the notification signal suitable for activating said particular remote stations to said assigned channel.

19. The central station of claim 18 wherein the notification means further comprises inhibit signal means for sending a signal suitable for inhibiting transmissions from said particular remote stations, said inhibit signal sent in conjunction with said assignment notification signal.

20. The central station of claim 17 wherein
the assigning means further comprises
means for transferring said associated particular stations signals to the priority queue register,
whereby if one of said particular stations becomes a requesting station it will be given priority in channel assignment.

21. The central station of claim 20 wherein the assigning means further comprises
a priority queue deleting means for transferring a station identification signal out of the priority queue register responsive to the absence of a channel request from said channel request station and said particular stations for a predetermined time interval.

22. The central station of claim 14 wherein the priority and nonpriority queuing registers are comprised of sequential shift circuitry such that channel assignments are made on a first-in/first-out basis to stored station identifications.

23. The central station of claim 14 wherein the assignment means further comprises
a priority queue deleting means for transferring a station identification signal out of the priority queue register responsive to the absence of a channel request from said station for a predetermined time interval.

24. In a communication system having a central control station and a plurality of identifiable remote stations, the central station routing communications between remote stations over a limited number of identified information channels, communication between the remote stations and the central station occurring on a signal channel, each communication including a message by each remote station, which message comprises a plurality of individual transmission, each remote station comprising:
controllably tuned transmitter means for transmitting on the signal channel or on an assigned information channel;
controllably tuned receiver means for receiving transmissions on the signal channel or on an assigned information channel;
channel requesting means coupled to the transmitter, for generating and sending a channel request signal, on the signal channel, to the central station;
identification means, coupled to the transmitter, for generating and sending a predetermined identification signal in conjunction with the request signal;
channel assigning means, coupled to the receiver, for receiving a channel assignment signal from the central station and, in response thereto, controllably tuning the transmitter and receiver to the assigned channel; and
end of transmission signalling means for transmitting an end of transmission signal to th central station at the conclusion of each of said individual transmissions.

25. The remote station of claim 24 further comprising
inhibit response means coupled to the receiver, for inhibiting said remote station from transmitting responsive to receiving an inhibit signal from the central station.

26. The remote station of claim 25 wherein the inhibit means further comprises
means controllably tuning said remote station receiver to the signal channel responsive to receiving said inhibit signal.

27. The remote station of claim 25 further comprising audible alert means for generating a distinct audible signal in response to the remote station receiving a inhibit signal.

28. The remote station of claim 24 further comprising
channel notification means, coupled to the receiver, for receiving a channel notification signal and, in response thereto, controllably tuning said receiver to the assigned channel and inhibiting transmission from the remote station transmitter.

29. The remote station of claim 24 wherein the channel requesting means further comprises means for generating the channel request signal in response to activation of a push to talk switch activiated microphone.

30. A method of assigning one of a limited number of information channels to a requesting one of a plurality of remote stations for communication by each of said remote stations of a message on said assigned channel, said message comprising a plurality of individual transmissions, the method comprising the steps of:
a. receiving the requesting signal;
b. identifying the requesting station;
c. monitoring said requesting station; and
d. truncating the assignation of said channel to said requesting station at the conclusion of each of the transmission of said identified requesting station, such that the channel is available for assignation to a second requesting station.

31. The method of claim 30 wherein the identifying step further comprises the steps of:
a. detecting an identify signal from said requesting station;
b. comparing said identity signals in an identity register; and
c. ignoring said requesting station if said identity signal does not match a corresponding signal in the identity register.

32. The method of claim 30 further comprising the steps of
a. assigning a priority to said identified requesting station; and
b. assigning an available information channel to said station if, and only if, available channels have been assigned to higher priority stations.

33. The method of claim 32 wherein the priority assigning steps further comprises the steps of:
a. comparing the identity of said requesting station with the identities of stations in a priority storage register;
b. transferring said identity signal to a priority queue if said identity matches a corresponding identity in said priority storage register; otherwise
c. transferring said identity signal to a nonpriority queue.

34. The method of claim 33 wherein the priority assigning step further comprises the steps of:
a. assigning said transferred identity signals, in said priority queue, on a first-in/first-out priority; and
b. assigning said transferred identity signals in said nonpriority queue on a first-in/first-out priority.

35. The method of claim 34 wherein the channel assigning step further comprises the steps of:
a. sensing for available channels;
b. assigning said available channels to stations in said priority queue in the priority order;
c. assigning the remaining available channels to said nonpriority queue stations in said priority order; and
d. alerting said requesting station if there are no currently available channels.

36. The method of claim 35 wherein the channel assigning step further comprises the step of:

transferring the identity of a requesting station to which a channel has been assigned from the non-priority to the priority storage.

37. The method of claim 36 wherein the channel assigning steps further comprise the step of:
deleting from said priority storage the identity signal of said requesting station responsive to an absence of a channel request from said station for a predetermined time interval.

38. The method of claim 35 wherein the channel assigning step further comprises:
a. comparing said identity signal with the identity signals in an associate station memory; and
b. notifying the particular stations, in said associate station memory which correspond to said requesting station, to receive on said assigned channel.

39. The method of claim 38 wherein the channel assigning step further comprises the step of:
transferring the identity signals of said particular stations to said priority storage.

40. The method of claim 39 wherein the channel assigning step further comprises the step of:
deleting from said priority storage the identity signal of said requesting stations and said particular stations responsive to the absence of a request signal from said requesting station and said particular stations for a predetermined time interval.

* * * * *